(12) United States Patent
Lin

(10) Patent No.: US 6,915,368 B2
(45) Date of Patent: Jul. 5, 2005

(54) COMPUTER SYSTEM AND PROCESSING METHOD FOR DRIVING PROGRAM OF SMART PERIPHERAL DEVICE

(75) Inventor: Tsung-Fan Lin, Taichung Hsien (TW)

(73) Assignee: Fang-Yu Su, Hsinchu (TW)

( * ) Notice: Subject to any disclaimer, the term of this patent is extended or adjusted under 35 U.S.C. 154(b) by 505 days.

(21) Appl. No.: 09/997,355

(22) Filed: Nov. 27, 2001

(65) Prior Publication Data

US 2003/0065857 A1 Apr. 3, 2003

(30) Foreign Application Priority Data

Sep. 28, 2001 (TW) ........................................ 90124028 A

(51) Int. Cl.[7] ............................ G06F 13/00; G06F 3/00
(52) U.S. Cl. ......................... 710/302; 710/10; 719/327
(58) Field of Search ........................... 710/10, 104, 300, 710/302, 304; 709/220–222; 719/315–316, 321–327

(56) References Cited

U.S. PATENT DOCUMENTS

| | | | | |
|---|---|---|---|---|
| 5,386,567 A | * | 1/1995 | Lien et al. ................... | 713/100 |
| 5,580,177 A | * | 12/1996 | Gase et al. ................... | 400/61 |
| 6,664,946 B1 | * | 12/2003 | Stipes et al. ................. | 345/157 |
| 2002/0095501 A1 | * | 7/2002 | Chiloyan et al. ........... | 709/227 |

OTHER PUBLICATIONS

Cant. "Windows Driver Model (WDM) Device Drivers" PHD Computer Consultants Ltd [online Jun. 16, 1999], [retrieved on Jun. 2, 2004]. Retrieved from the Internet <URL: http://www.phdcc.com/WDMarticle.html>.*

Ong. "Plug–and–Play for a Winning Combination". CMP-net.asia [online Sep. 1, 2000], [retrieved on Jun. 2, 2004]. Retrieved from the Internet <URL: http://www.cmpnetasia.com/PrintArticle.cfm?Artid=4012>.*

Koeman K. Universal Seral Bus Understanding WDM Power Management, Version 1.0. Intel Corporation. Nov. 5, 1999.*

"When Are WDM Device Objects Created?". Kernel Mode Driver Architecture: Windows DDK. [online Mar. 25, 2004], [retrieved on Jun. 2, 2004]. Retrieved from the Internet <URL: http://msdn.microsoft.com/library/en–us/kmarch/hh/kmarch/devobjts_5fs7.asp?frame=true>.*

"Guidelines for Handling Plug and Play IRPS". Windows Hardware and Driver Central. [online Dec. 4, 2001], [retrieved on Jun. 2, 2004]. Retrieved from the Internet <URL: http://www.microsoft.com/whdc/archive/irppnp.mspx>.*

"Plug and Play for Windows 2000 and Windows XP". Windows Hardware and Driver Central. [online Dec. 4, 2001], [retrieved on Apr. 22, 2004]. Retrieved from the Internet <URL: http://www.microsoft.com/whdc/hwdev/tech/pnp/pnpnt5_2.mspx?pf=true>.*

IEEE Standard for a High Performance Serial Bus. The Institute of Electrical and Electronics Engineers, Inc. 1996.*

Universal Serial Bus Specification. Revision 1.1. Compaq Computer Corporation, Intel Corporation, Microsoft Corporation, NEC Corporation. Sep. 23, 1998.*

* cited by examiner

Primary Examiner—Mark H. Rinehart
Assistant Examiner—Thomas J. Cleary
(74) Attorney, Agent, or Firm—J.C. Patents

(57) ABSTRACT

A processing method and a computer system for the driving program of a smart peripheral device. The processing method requests that the computer's operating system return any information regarding any smart peripheral device connected to a peripheral bus through a driving program written according to this invention. If the particular smart peripheral device is supported by the operating system, a plug-and-play notification is used to open a function device object established through a factory-provided driving program. The function device object is used to retrieve a physical device object established through a bus-driving program. Using the physical device object, descriptors and calling data of the smart peripheral device are retrieved and employed to set up necessary information for executing the driving program of this invention.

15 Claims, 3 Drawing Sheets

COMPUTER SYSTEM AND PROCESSING METHOD FOR DRIVING PROGRAM OF SMART PERIPHERAL DEVICE

CROSS-REFERENCE TO RELATED APPLICATION

This application claims the priority benefit of Taiwan application serial no. 90124028, filed Sep. 28, 2001.

BACKGROUND OF THE INVENTION

1. Field of Invention

The present invention relates to the driving program of a peripheral device. More particularly, the present invention relates to the computer system and processing method for the driving program of a smart peripheral device.

2. Description of Related Art

At present, more and more smart peripheral devices such as personal digital assistants (PDA) and smart phones have the capacity to hook up with a personal computer via a peripheral bus such as universal serial bus (USB) and IEEE-1394 bus. Both the USB and the IEEE-1394 have plug-and-play (PnP) features. The operating system of a personal computer may retrieve factory-supplied driving program to drive the peripheral devices once they are plugged to one of the two major types of buses. Using the factory-supplied synchronous programs (for example, palm desktop, active-sync and so on), the personal computer may synchronize with the peripheral device to perform data uploading or transmission.

Because former peripheral devices were mostly single purpose devices, that is, devices purely for data transmission and reception, the application programming interface (API) provided by most factory-supplied driving programs performs simple interface functions. However, with the rapid development of smart peripheral devices, many of the devices are programmable and are receptive to various types of programs. Hence, in some applications, application programs within the personal computer and programs within the peripheral device need to transmit data to each other through the peripheral bus. For example, a touch panel on the peripheral device may serve as a writing board for the personal computer, images on the digital imaging device of a peripheral device may be transmitted to the personal computer for further processing or the PDA may record sound. Yet, all these applications are outside the scope of the original factory-supplied synchronizing programs.

Conventionally, communication with the various programs of a smart peripheral device relies on the application program interface provided by the original driving program provider. Through the factory-provided driving programs, the application programs of a personal computer may transmit data to the smart peripheral device and vice versa via the peripheral bus.

Furthermore, the originating factory provides only minimal API functions rather than general-purpose API functions. If different smart peripheral devices are plugged into the peripheral bus, the application program needs to adjust the calling method according to the API within the driving program supplied by the originating factory and hence generates much inconvenience.

Another method of dealing with smart peripheral device is to switch the peripheral bus into a diagnostic mode. In other words, an API is provided such that the application program at the personal computer end is able to communicate with the smart peripheral device. Under the diagnostic mode, the peripheral bus cannot coexist with the factory-supplied driving programs in the same operating system. Hence, if different smart peripheral devices are used, the peripheral must switch to an appropriate diagnostic mode. Furthermore, only original factory-supplied driving programs are found when a new peripheral device is plugged into the peripheral bus. Because diagnostic mode cannot be switched in a dynamic state, switching must be initiated by a re-plugging of the smart peripheral device. Consequently, if peripheral devices have already been plugged into the peripheral bus and some factory-supplied driving programs has already been downloaded, the smart peripheral device must be re-plugged to switch into the diagnostic mode.

In brief, major drawbacks into conventional techniques include:

1. Operation depends heavily on API provided by factory-supplied driving programs.
2. Factory-supplied API provides minimal functions rather than general-purpose functions. If different smart peripheral devices need to plug into the peripheral bus, the calling method of application programs must be adjusted according to the type of API provided by factory-supplied driving programs resulting in great inconvenience.
3. When the peripheral bus switches into the diagnostic mode, different smart peripheral devices require different diagnostic modes and the smart peripheral device need to be plugged in again. Furthermore, the diagnostic mode cannot coexist with the factory-supplied driving programs in the same operating system.

SUMMARY OF THE INVENTION

Accordingly, one object of the present invention is to provide a computer system and a processing method for dealing with the driving programs of a smart peripheral device. The driving program according to this invention does not depend on the application programming interface (API) within the factory-provide driving programs. Hence, problems resulting from a reliance on the API of factory-supplied driving programs and problems resulting from incompatible API due to the presence of a variety of driving programs each developed by a different manufacturer are avoided. Furthermore, the driving programs according to this invention can coexist with factory-supplied driving program in the same operating system. Therefore, there is no need to switch API when a different application program is used, download driving programs or re-plug the smart peripheral device.

To achieve these and other advantages and in accordance with the purpose of the invention, as embodied and broadly described herein, the invention provides a method of processing the driving program of a smart peripheral device. The method is suitable for processing the operating system of a computer system. The smart peripheral device may connect with the computer system via a peripheral bus and the operating system includes a bus-driving program for controlling the peripheral bus. The processing method includes the following steps. First, the driving programs of the smart peripheral device according to this invention request the operating system to report on any peripheral device having linkage with the peripheral bus. According to the plug-and-play notifications received from the operating system, the driving program of the smart peripheral device are inspected to see if they support any peripheral bus linked peripheral device. If the driving program of the smart peripheral device supports the linked peripheral device, the plug-and-play notifications are used to trigger the function device object established through the factory-provided driving programs. According to the function device object, the physical device object established through the bus driving programs is retrieved. Thereafter, descriptor and calling information of the connected peripheral device are retrieved according to the physical device object. Through the descriptor and calling information, various types of information required for executing the driving programs of a smart peripheral device is established.

This invention also provides a computer system capable of connecting with a smart peripheral device. The computer system includes a peripheral bus, an operating system, a factory-provided driving program and a general-purpose driving program. The smart peripheral device is coupled to the computer system via the peripheral bus. The operating system includes a bus-driving program for controlling the peripheral bus. The bus-driving program is utilized to establish a physical device object corresponding to the smart peripheral device. The factory-provided driving program is utilized to establish a function device object. The function device object communicates with the smart peripheral device through the physical device object. The general-purpose driving program communicates with the smart peripheral device also through the physical device object. As soon as the smart peripheral device is connected to the computer system, the general-purpose driving program triggers the function device object established through the factor-provided driving program. The physical device object established through the bus-driving program is retrieved according to the function device object. Thereafter, descriptor and calling information of the smart peripheral device are retrieved according to the physical device object. Using the descriptor and calling information, various types of information necessary for executing the general-purpose driving program are established.

In brief, the driving program according to this invention does not depend on the API of factory-provided driving programs. Hence, the need to receive APIs from factory-provided driving programs is eliminated and the problem of having incompatible APIs due to each smart peripheral device manufacturer manufacturing its own driving program is solved. Furthermore, the driving program according to this invention may coexist with the factory-provided driving program in the same operating system. Hence, there is no need to switch APIs, download driving programs or re-plug when a different application program is used.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
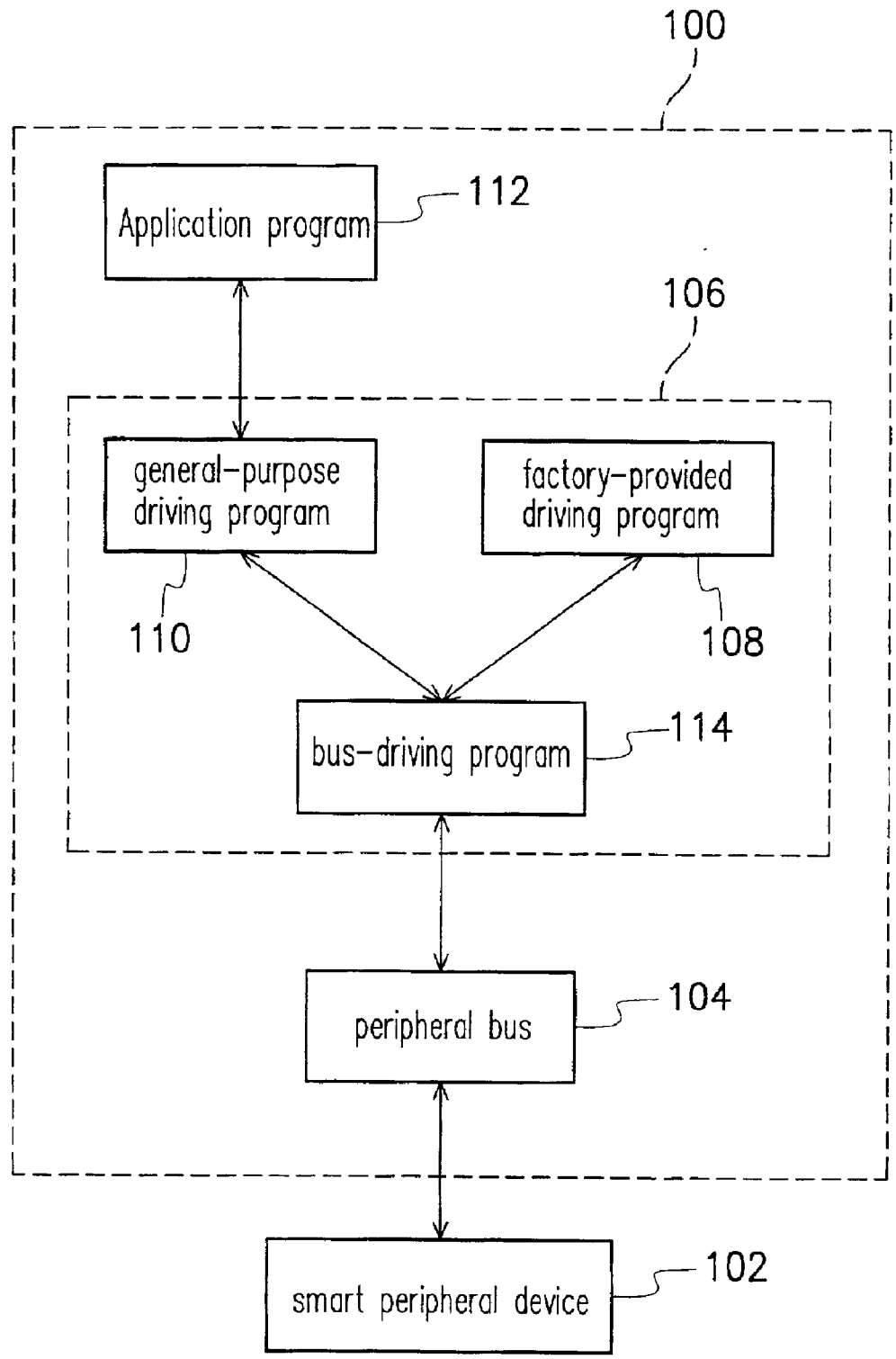
FIG. 1 is a block diagram showing a computer system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing a computer system according to one preferred embodiment of this invention. As shown in FIG. 1, the computer system 100 includes a peripheral bus 104, an operating system 106, a factory-provided driving program 108 and a general-purpose driving program 110 designed according to this invention. A smart peripheral device 102 is coupled to the computer system 100 via the peripheral bus 104. The peripheral bus 104 can be a USB bus or an IEEE-1394 bus, for example. The operating system 106 further includes a bus-driving program 114 that controls the peripheral bus 104. The bus-driving program 114 establishes a physical device object (PDO) that corresponds to the smart peripheral device 102. The factory-provided driving program 108 establishes a function device object (FDO). The function device object communicates with the smart peripheral device 102 through the physical device object. Similarly, the general-purpose driving program 110 communicates with the smart peripheral device 102 through the physical device object. As soon as the smart peripheral device 102 is hooked onto the computer system 100, the general-purpose driving program 110 switches on the function device object established by the factory-provided driving program 110. The physical device object established by the bus-driving program 114 is retrieved according to the function device object. Descriptor and calling information related to the smart peripheral device 102 are retrieved according to the physical device object. The descriptor and calling information are utilized to establish various data necessary for executing the general-purpose driving program 110.

In addition, the computer system 100 further includes an application program 112. When the application program 112 issues a processing request call to the general-purpose driving program 110, the general-purpose driving program 110 produces a request block and an input/output request packet (IRP). The input/output request packet is transmitted to the physical device object for further processing. The request block, for example, is a USB request block (URB) or an IEEE-1394 request block (IRB). Similarly, the input/output request packet can also be a URB or an IRB. After the input/output request packet is processed, the physical device object returns correct data to the application program 112. On the other hand, if there is a delay in the processing of the input/output request package, the physical device object responds by returning a delay signal to the application program 112.

Figure 2:
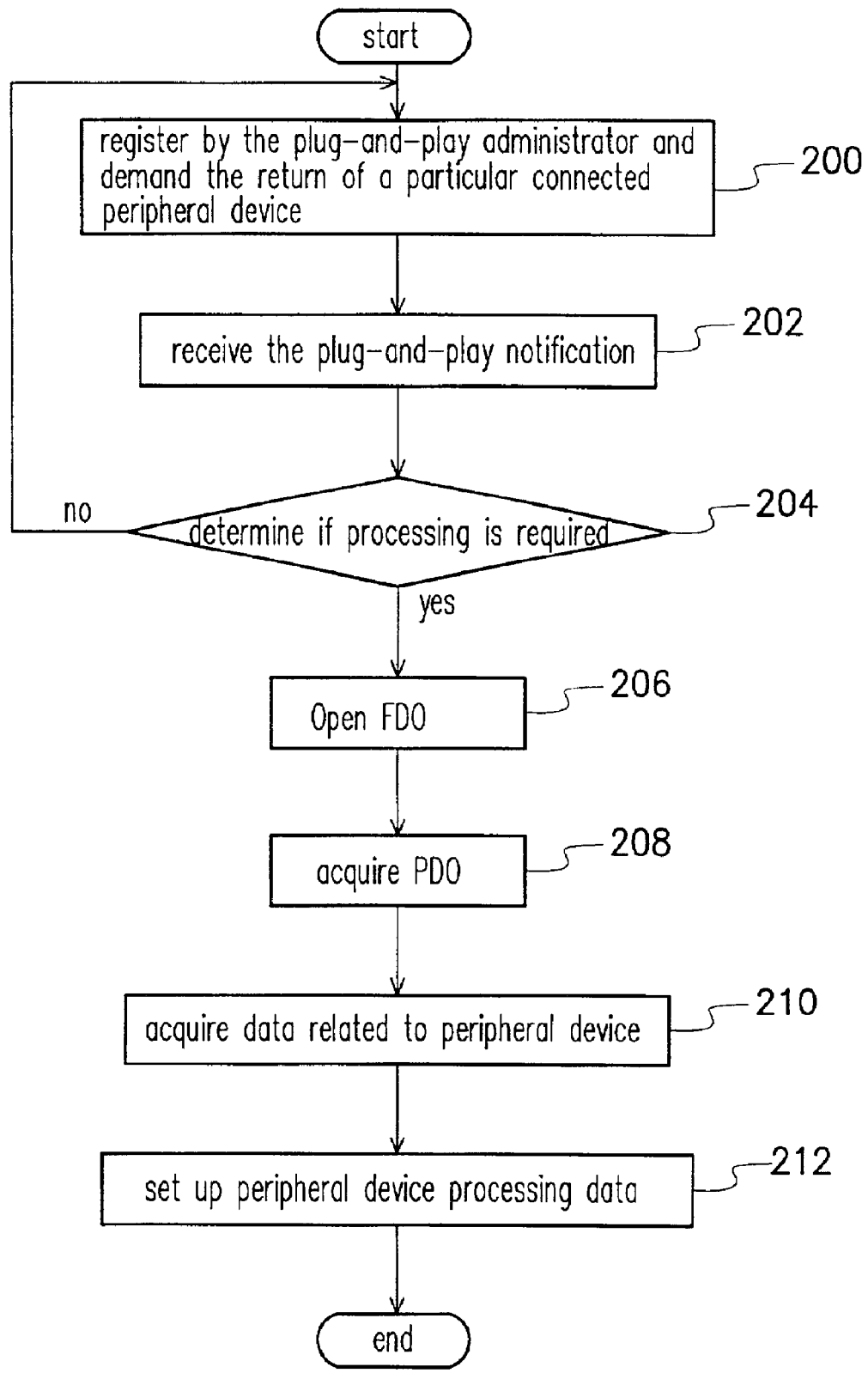
FIG. 2 is a flow-chart showing a series of steps for processing the driving program of a smart peripheral device according to one preferred embodiment of this invention.

FIG. 2 is a flow-chart showing a series of steps for processing the driving program of a smart peripheral device according to one preferred embodiment of this invention. In the following, the processing steps are explained with reference to FIG. 1. First, the general-purpose driving program 110 registers itself with the plug-and-play administrator of the operating system 106 and requests the smart peripheral device having a class identification (CLSID) that meets the peripheral bus 104. In general, each peripheral bus has a different CLSID. In this embodiment, the CLSID can either be a USB CLSID or an IEEE_1394 CLSID.

When the peripheral bus 104 already has a smart peripheral device 102 plugged into the peripheral bus 104 or a new smart peripheral device 102 is plugged into the peripheral bus 104, the operating system 106 utilizes the plug-and-play notification to inform the general-purpose driving program (in step 202).

According to the special identification code provided by the plug-and-play notification, the smart peripheral device 102 is checked to see if the smart peripheral device 102 meets the operating characteristics of the types of peripheral devices processed by the general-purpose driving program 110 (in step 204). If the peripheral bus 104 is a USB bus, the special code is the vender identification (VID) and the product identification (PID). On the other hand, if the peripheral bus is the IEEE-1394 bus, the special code is the plug-and-play identification (PnPID).

If the general-purpose driving program 110 supports the smart peripheral device 102, device name and other data from plug-and-play notification corresponding to the smart peripheral device 102 are used to retrieve the device object. The device object has a stacked structure. Thereafter, the factory-provided driving program established function device object is opened (in step 206).

According to the function device object, a special input/output request packet (IRP) is prepared and the function device object is called. When the lower layer of the device object processes the special input/output request packet, it will report its pointer in the special input/output request packet. A block of memory is set aside for holding data indicated by the pointer. On returning from the function device object, physical device object is retrieved according to the pointer within the special input/output request packet and then the memory block is release (in step 208). Note that since the device object has a stacked structure, the function device object is formed over and above the physical device object of the bus-driving program 114. The special input/output request packet is processed such that the input/output request packet is downwardly delivered, layer by layer, so that the driving program of each layer may be reported. The special input/output request packet is sent to the function device object in this manner. Because the special input/output request packet not processed by the function device object is delivered to the next lower layer, pointers of the physical device object in the next lower layer can be retrieved.

Descriptor and calling data of the smart peripheral device 102 are retrieved according to the physical device object (in step 210). According to the descriptor and the calling data, various data necessary for executing the general-purpose driving program 110 of the smart peripheral device 102 are established (in step 212). In this embodiment, if the peripheral bus is the USB bus, the descriptor and calling data include device descriptor, configuration descriptor, interface descriptor, end-point descriptor and USB pipe. On the other hand, if the peripheral bus is the IEEE-1394 bus, the descriptor and calling data include configuration ROM. For example, from the descriptor and calling data, transmission characteristics such as control, interrupt, bulk or isochronous of the end point, size of the largest transmission packet at the end point or USB pipe handle of the end point may all be obtained.

If the received plug-and-play notification indicates the absence of the particular smart peripheral device 102, the application program 112 for calling the general-purpose driving program 110 is informed of the non-existence of the smart peripheral device 102. Afterwards, all requests for processing the non-existent smart peripheral device are canceled. Finally, the operating system 106 is returned to its initial state.

In addition, when the smart peripheral device 102 is automatically shut to preserve energy or the smart peripheral device 102 is removed from the peripheral bus 104, the operating system 106 informs the general-purpose driving program 110 through the plug-and-play notification. After the general-purpose driving program 110 has confirmed the removal of the smart peripheral device 102, the application program 112 is informed and the in-process requests for transmission or reception are canceled. Again, the operating system 106 is returned to its initial state.

Figure 3:
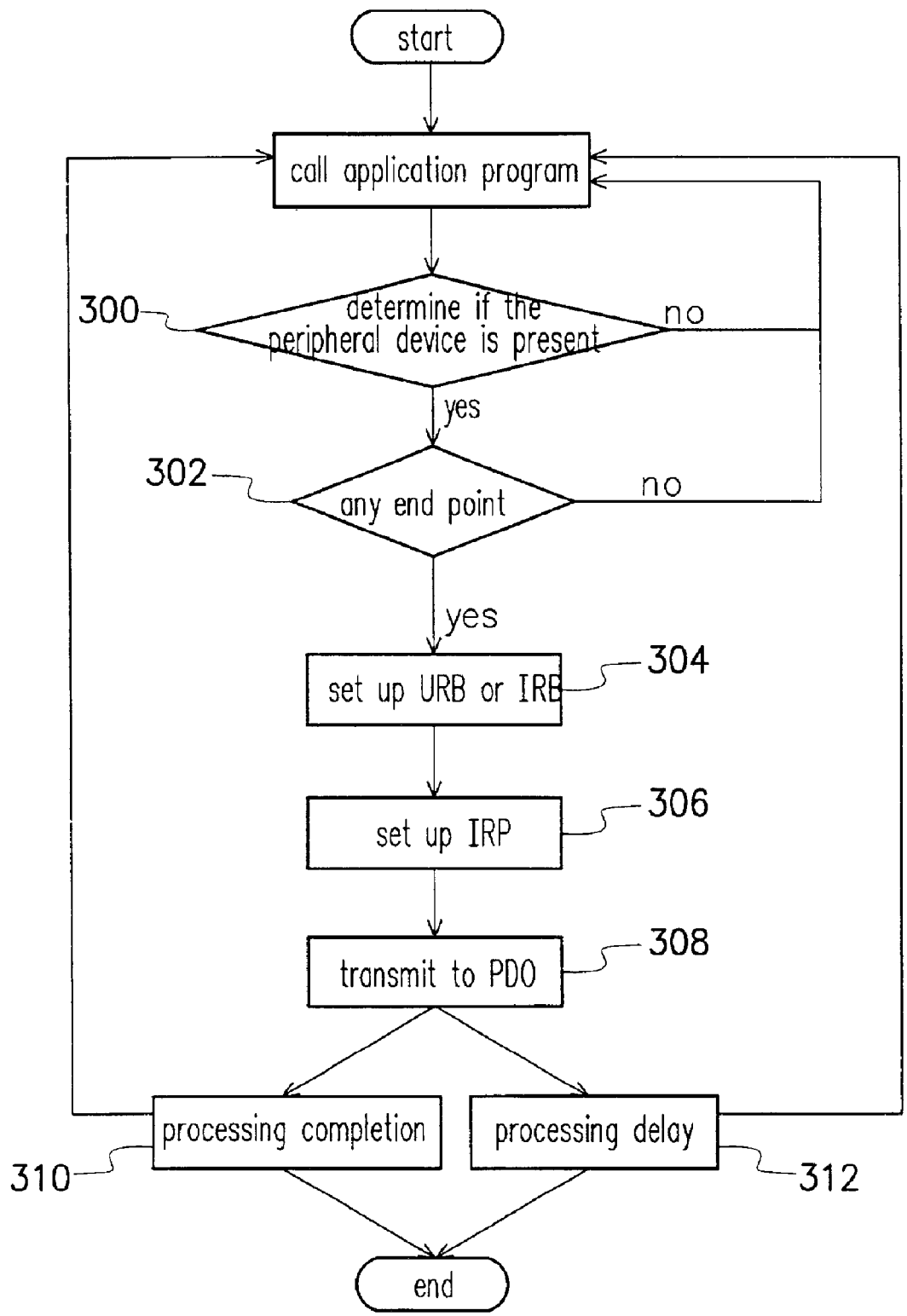
FIG. 3 is a flow-chart showing a series of steps for processing the driving program of a smart peripheral device when the application program uses a processing request to call up the driving program according to this invention.

FIG. 3 is a flow-chart showing a series of steps for processing the driving program of a smart peripheral device when the application program uses a processing request to call up the driving program according to this invention. The following is explained with reference to FIG. 1. When the application program 112 calls up the general-purpose driving program 110 to process requests, an inspection is carried out to determine if the smart peripheral device 102 is really absent (in step 300). If the smart peripheral device 102 is really absent, an error signal is sent back to the application program 112. If the smart peripheral device 102 is present, a search for end point that corresponds to the processing request of the smart peripheral device 102 is sought (in step 302). When no such end point for the smart peripheral device 102 is found, an error signal is returned to the application program 112. On the other hand, if the smart peripheral device 102 has an end point, a request block is set up (in step 304). The request block is selected from either the URB or the IRB and then the input/output request packet is set up (in step 306). The input/output request packet is either a URB or an IRB. The input/output request packet is transmitted to the physical device object for further processing (in step 308). After the physical device object has completely processed the input/output request packet, a correct signal is sent to the application program 112 (in step 310). When the physical device object encounters some delay, a delay signal is returned to the application program 112 (in step 312).

In conclusion, major advantages of this invention include:
1. The driving program used in this invention does not depend on the API of factory-provided driving programs. Hence, the need to receive APIs from factory-provided driving programs is eliminated.
2. Because the driving program used in this invention does not depend on the API of factory-provided driving programs, the problem of having incompatible APIs due to each smart peripheral device manufacturer manufacturing its own driving program is solved.
3. The driving program according to this invention may coexist with the factory-provided driving program in the same operating system. Hence, there is no need to switch the API, download a driving program or re-plug when a different application program is used.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of processing the driving program of a smart peripheral device in a computer system using an operating system, wherein the smart peripheral device is connected to the computer system through a peripheral bus and the operating system includes a bus-driving program for controlling the peripheral bus and the processing method comprising:
    requesting that the operating system return any data regarding a connectivity status of a particular peripheral device connected to the peripheral bus;
    receiving any plug-and-play indicator from the operating system;
    inspecting a driving program of the smart peripheral device using the plug-and-play notification and determining whether the connected peripheral device is supported; and
    if the connected peripheral device is supported,
        using the plug-and-play notification to open the function device object established by a factory-provided driving program;
        using the function device object to retrieve a physical device object established through the bus-driving program;
        using the physical device object to retrieve a plurality of descriptors and calling data of the connected peripheral device; and
        using the descriptors and calling data to set up necessary data for executing the driving program of the smart peripheral device;
    if the connected peripheral device is not supported, a general-purpose driving program for communicating with the smart peripheral device through the smart peripheral device to the physical device object, where if the smart peripheral device is connected to the computer system:
        the general-purpose driving program switches on the function device object in order to:
            retrieve the physical device object established through the bus-driving program according to the function device object; and
            retrieve a plurality of descriptors and calling data of the smart peripheral device according to the physical device object: and
            finally set up necessary information for executing the general-purpose driving program.

2. The processing method of claim 1, wherein requesting that the operating system return any data regarding the connectivity status of a particular peripheral device connected to the peripheral bus further includes registering the request under a plug-and-play administrator within the operating system and requesting that a classification identification for the connected peripheral device matching the peripheral bus be returned.

3. The processing method of claim 1, wherein receiving the plug-and-play notification from the operating system occurs when the peripheral device has already plugged into the peripheral bus or the peripheral device has just been plugged into the peripheral bus, and the operating system utilizes the plug-and-play notification to inform the driving program, wherein requesting that the operating system return any data regarding the connectivity status of a particular peripheral device connected to the peripheral bus further includes registering the request under a plug-and-play administrator within the operating system and requesting that a classification identification for the connected peripheral device matching the peripheral bus be returned.

4. The processing method of claim 1, wherein using the plug-and-play notification to inspect whether the driving program supports the connected peripheral device or not includes using a special identification code in the plug-and-play notification to inspect the connected peripheral device and determine if the connected peripheral device matches the smart peripheral device to be processed by the driving program.

5. The processing method of claim 4, wherein;
    if the peripheral bus is a Universal Serial Bus (USB), the special identification code is a vender identification and a product identification; and
    if the peripheral bus is an IEEE-1394 bus, the special identification code is a plug-and play identification.

6. The processing method of claim 1, wherein the plug-and-play notification is independent and compatible with the operating system to open the function device object established through the factory-provided driving program includes using a device name within the plug-and-play notification corresponding to the connected peripheral device.

7. The processing method of claim 1, wherein using the function device object to retrieve the physical device object established through the bus-driving program further includes to:
    prepare a special input/output request packet and calling the function device object; and
    retrieve the physical device object according to a pointer returned from the function device object inside the special input/output request packet,
    wherein if an application program used by the computer system issues a processing request to call up the driving program of the smart peripheral device, the processing method further includes;
    inspecting the connected peripheral device to check if the peripheral device really exists,
    if the peripheral device is absent, responding by issuing an error signal to the application program, and
    if the peripheral device is not absent, determining whether there is a process request corresponding thereto and a related end point for the connected peripheral device:
        if the peripheral device does not have any end point, responding by returning the errors signal to the application program: and
        if the peripheral has end point, then:
            setting up a request block;
            setting up an input/output request packet:
    transmitting the input/output request packet to the physical device object for further processing,
        when the physical device object finishes processing, responding by sending a correct signal to the application program; and
        when the physical device object encounters a delay, responding by sending a delay signal to the application program.

8. The processing method of claim 1, wherein, if the peripheral bus is a Universal Serial Bus (USB), the descriptors and calling data include a device descriptor, a configuration descriptor, an interface descriptor, an end-point descriptor and a USB pipe handles.

9. The processing method of claim 1, wherein if the peripheral bus is an IEEE-1394 bus, the descriptor and the calling data are stored a configuration read-only-memory.

10. The processing method of claim 1, where if the received plug-and play notification indicates an absent peripheral device, and the processing includes:

inspecting whether the peripheral device is really absent;

informing through calling an application program of the driving program of the peripheral device that the peripheral device is absent;

canceling any in-process request on the absent peripheral device; and returning the operating system to an initial state.

11. The processing method of claim 10, wherein the non-existence of the peripheral device means either a shut-down of power to the peripheral device or a removal of the peripheral device from the peripheral bus.

12. The computer system of claim 11, wherein the peripheral bus is either a Universal Serial Bus on an IEEE-1394 bus.

13. The computer system of claim 11, wherein the system further includes an application program such that when the application program issues a processing request call to the general-purpose driving program without additional interface or driver, and the process includes:

the general-purpose driving program sets up a request block and an input/output request packet, the input/output request packet is sent to the physical device object for further processing, and after processing, the physical device object responds by sending a correct signal to the application program, and if the processing encounters a delay, the physical device object responds by sending a delay signal to the application program.

14. The processing method of claim 1, wherein the peripheral bus is either a Universal Serial Bus (USB) or an IEEE-1394 bus.

15. A computer system connected to a smart peripheral device without changing application programming interface or loading additional driver, the computer system comprising:

a peripheral bus for connecting the smart peripheral device to the computer system;

an operating system having a bus-driving program for controlling the peripheral bus, wherein the bus-driving program includes a physical device object for corresponding with the smart peripheral device and inspecting a driving program of the smart peripheral device using the plug-and-play notification and determining whether the connected peripheral device is supported;

a factory-provided driving program having a function device object, wherein the function device object communicates with the smart peripheral device through the physical device object; and a general-purpose driving program for communicating with the smart peripheral device through the physical device object, where if the smart peripheral device is connected to the computer system and the connected peripheral device is not supported, the general-purpose driving program process includes to:

switch on the function device object established through the factory-provided driving program;

retrieve the physical device object established through the bus-driving program according to the function device object;

retrieve a plurality of descriptors and calling data of the smart peripheral device according to the physical device object; and finally set up necessary information for executing the general-purpose driving program.

* * * * *